(12) United States Patent
Zorky

(10) Patent No.: US 7,836,061 B1
(45) Date of Patent: Nov. 16, 2010

(54) METHOD AND SYSTEM FOR CLASSIFYING ELECTRONIC TEXT MESSAGES AND SPAM MESSAGES

(75) Inventor: Kirill P. Zorky, Moscow (RU)

(73) Assignee: Kaspersky Lab, ZAO, Moscow (RU)

(*) Notice: Subject to any disclaimer, the term of this patent is extended or adjusted under 35 U.S.C. 154(b) by 366 days.

(21) Appl. No.: 11/967,144

(22) Filed: Dec. 29, 2007

(51) Int. Cl.
*G06F 17/30* (2006.01)

(52) U.S. Cl. ................................ 707/749; 707/750

(58) Field of Classification Search ............ 707/749, 707/750
See application file for complete search history.

(56) References Cited

U.S. PATENT DOCUMENTS

| | | | | |
|---|---|---|---|---|
| 6,421,669 | B1 * | 7/2002 | Gilmour et al. | 707/750 |
| 6,668,251 | B1 * | 12/2003 | Goldberg | 707/706 |
| 6,901,398 | B1 * | 5/2005 | Horvitz et al. | 709/207 |
| 6,934,702 | B2 * | 8/2005 | Faybishenko et al. | 707/749 |
| 6,950,821 | B2 * | 9/2005 | Faybishenko et al. | 707/688 |
| 7,293,013 | B1 * | 11/2007 | Horvitz et al. | 707/694 |
| 2004/0128355 | A1 * | 7/2004 | Chao et al. | 709/206 |
| 2008/0168555 | A1 * | 7/2008 | Oliver et al. | 726/22 |
| 2009/0077617 | A1 * | 3/2009 | Levow et al. | 726/1 |
| 2009/0089375 | A1 * | 4/2009 | Osterberg, Jr. | 709/206 |
| 2009/0300129 | A1 * | 12/2009 | Golub | 709/206 |
| 2009/0307771 | A1 * | 12/2009 | Rajan et al. | 726/22 |
| 2010/0017487 | A1 * | 1/2010 | Patinkin | 709/206 |

* cited by examiner

*Primary Examiner*—Don Wong
*Assistant Examiner*—Kim T Nguyen
(74) *Attorney, Agent, or Firm*—Bardmesser Law Group

(57) ABSTRACT

Techniques for classifying electronic text messages include creating a hierarchical list of message categories, composing databases of key terms and sample phrases for each of such categories, and, based on a number and features of the key terms detected in an analyzed text message, determining if the text message is associated with at least one message category of interest. Variants of the key terms or can be produced using fuzzy text objects generation algorithms. Weight factors for the key terms and similarity scores of a text message compared to previously identified sample messages for a particular message category are calculated based on properties of the key terms detected in the text message, such as a frequency of use, location, or appearance in the text message, a number of words in the respective key terms.

20 Claims, 2 Drawing Sheets

METHOD AND SYSTEM FOR CLASSIFYING ELECTRONIC TEXT MESSAGES AND SPAM MESSAGES

BACKGROUND OF THE INVENTION

1. Field of the Invention

The present invention relates to computer text classification, and more particularly, to a method and system for classifying electronic text messages.

2. Description of the Related Art

Many forms of electronic communications and, in particular, electronic mail (email) communications via the Internet and other communication networks have become abused by certain users, which utilize them for mass distribution of unsolicited messages commonly referred to as "spam".

U.S. Pat. Nos. 7,103,372 and 6,212,532 disclose methods for classifying electronic text messages, which are based on searching for key phrases in subject headers of email messages or applying search mechanisms relying on centralized lists of specific text strings, such as trade names, product brands, email's sender addresses, and the like. However, these references address only a few of particular aspects of spam-identifying techniques.

Despite considerable efforts devoted to detection of spam, electronic communications are still vulnerable to many sources of spam of ever-increasing level of sophistication. Therefore, further improvements in techniques for classifying electronic text messages would be desirable.

SUMMARY OF THE INVENTION

Accordingly, the present invention is directed to techniques for classifying text messages, and more particularly, to a method and system for classifying electronic text messages that substantially obviates one or more of the disadvantages of the related art.

According to one embodiment, a method of classifying electronically-acquired text messages includes the steps of creating a hierarchic list of message categories, composing databases of key terms and sample messages for each of the message categories, calculating a weight factor and a similarity score of a text message (e.g., email message) relative to the key terms and sample messages, and determining if the text message is associated with one or more of the message categories.

Another embodiment of the present invention provides a system implementing portions of the inventive method for classifying text messages.

Yet another embodiment of the present invention provides a computer program product that, when executed by a computer processor, implements portions of the inventive method for classifying text messages.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

Figure 1:
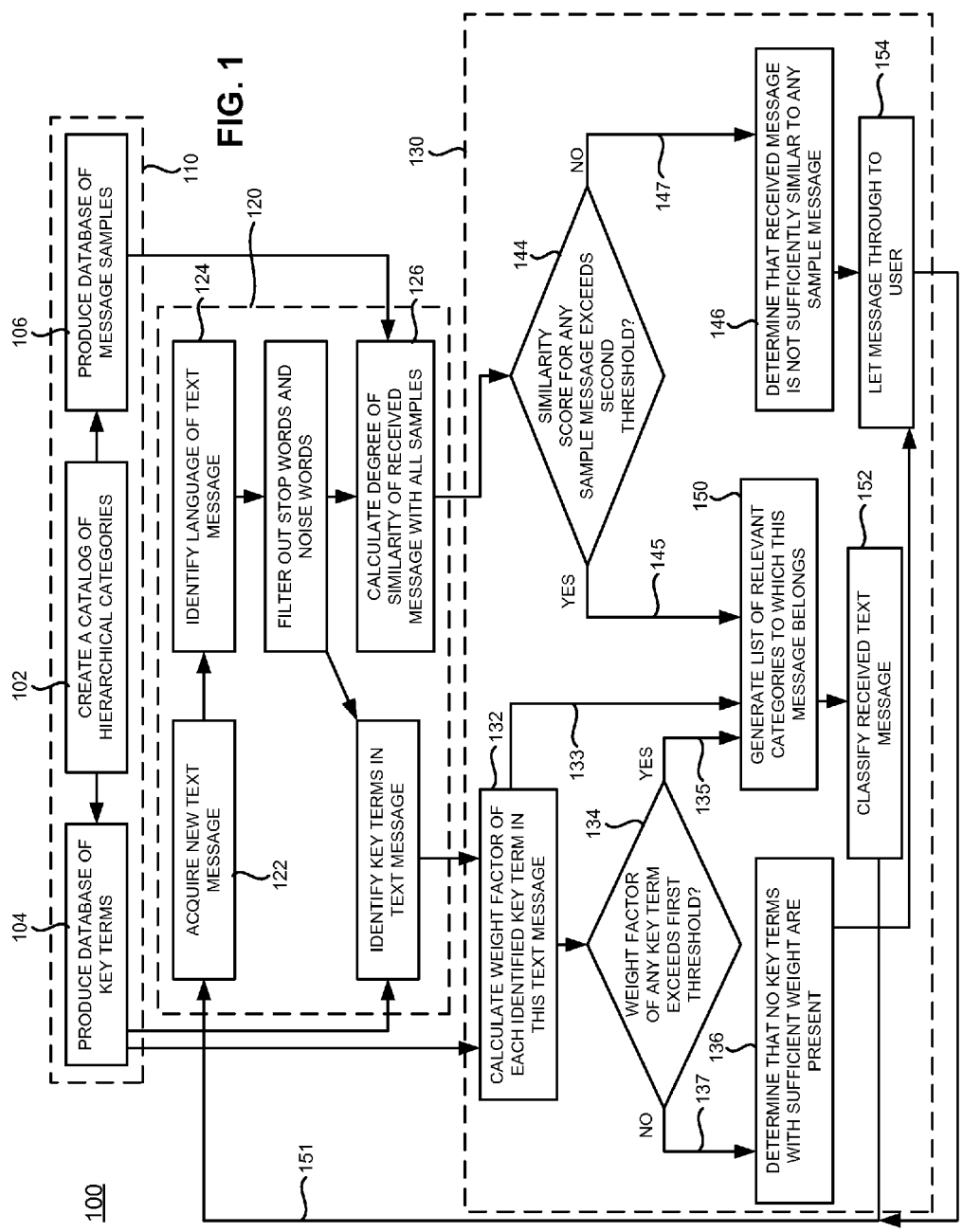
FIG. 1 illustrates a method of classifying electronic text messages in accordance with one embodiment of the present invention.

The images in the drawings are simplified for illustrative purposes and are not depicted to scale. It has been contemplated that features or steps of one embodiment may beneficially be incorporated in other embodiments without further recitation.

DETAILED DESCRIPTION OF THE PREFERRED EMBODIMENTS

Reference will now be made in detail to the preferred embodiments of the present invention, examples of which are illustrated in the accompanying drawings.

As used herein, the term "key term" refers to a single word, a combination of words, a phrase, or, in some circumstances, a sentence. Here, "message" refers to a email, or a similar document. Typically, messages include a number of words, sentences, phrases, an so on, some of which may be key terms.

At a high level, one embodiment of the present invention involves the following steps:

1. Generating a hierarchical list of categories, referred to as a "rubricator", which defines the properties of the identified categories.

2. Storing, in a database, the semantic image of each category, in the form of a list of key terms. The presence of each of the key terms in a message is an indication that, with a given probability, the message belongs to a particular category.

3. Storing, in the database, sample messages for each of the categories. The sample messages are those that unequivocally belong to that category.

4. When a new electronic text message is received, the language of the message is identified automatically.

5. The message is filtered, to remove "noise words," such as articles, prepositions, and so forth.

6. Key terms are identified in the received message, for those key terms that are stored in the database.

7. The weight of the received electronic text message is determined, relative to a particular category, if the text message has at least one, and usually more than one, key terms from the semantic image of the particular category. The particular category is therefore considered to be relevant to the text message, if the calculated weight exceeds a first threshold.

8. The degree of similarity of the received text message is calculated relative to each of the sample messages that are stored in the database. If the degree of similarity exceeds a certain threshold for any of the sample messages stored in the database (a second threshold), then this category is considered relevant for this particular text message.

9. For the received text message, a resulting list of relevant categories is formed, based on the previous steps. Thus, the text message is rubricated into the relevant categories.

As one option, the hierarchical list of the possible categories can be relatively complete, or can be relatively sparse. The procedure described in steps 1-9 above can be repeated for all the possible categories, or for only some of the categories.

As one option, the categories can be only those that are generally spam related. For example, one category could be "Internet get rich schemes", another category can be "Viagra related", another category could be "stock schemes", and so forth. On the other hand, the hierarchy can be considerably more complete, and can include categories that are not spam related. This can also aid the user in categorizing incoming email, aside from the determination of a likely spam/not spam.

As yet a further option, the list of categories can be defined by the user to be only those categories that the user is interested in (as opposed to a full rubricator). Thus, the user can filter emails that are of interest to him to predefined folders, while remaining emails can go into, for example, the general in-box, or be presumed to be spam, and go into a spam folder. In other words, the rubricator scheme described above can be used both to include received messages in a particular category, and to exclude received messages from some particular category (for example, if a particular key term is present, the message will not be classified as spam, even if contains enough other key terms that would make it a spam message).

As noted earlier, the approach to email filtering using the rubricator can be both inclusive and exclusive. In the case of spam, the objective is to identify spam emails and filter them out, but let through everything else. In the case of user-interest-based rubricator categories, the objective is to specifically identify those emails that are of particular interest to the user, and alert the user in some fashion that emails of particular interest to him have arrived.

As yet a further option, when the weight of the message is determined, one mechanism for doing so is based on the number of key terms that are identified in the message, the number of repetitions of the key terms, the length of the key terms (particularly if the key term is a phrase or a sentence), the length of the entire text message, and so on.

As yet a further option, the key terms can be identified both for the entire message, as well as for only portions of the message (such as certain fields in the email, and so on).

As yet a further option, the calculation of degree of similarity with sample messages in the database can use fuzzy logic comparison of the texts of the two messages. The lexical content of the messages can be compared, which should also include word morphology.

With reference to FIG. 1, in one embodiment of the present invention, a method 100 of classifying electronic text messages starts at step 102, where a catalog of message categories is created. The catalog contains, in one or several languages, message categories relating to subject matters of particular interest, for example, the subject matters that may be found or expected in spam electronic mail (email) messages or portions thereof. In some embodiments, the message categories relate to spam offerings or advertisements marketed on the Internet by means of mass-mailed email messages or to unquotable expressions in contents of email messages.

Illustratively, a portion of a hierarchical list of spam-related message categories may include, among other such categories and sub-categories, for example:

Drugs and medications
Cheap drugs or medications online
Drugs or medications with immediate positive effect
Drugs or medications not approved by a governing body (e.g., FDA)
Drugs or medications available without a prescription
Free products or services
Free computer software or hardware
Free music or movies
Free financial services (mortgage/loan origination, stock trades, etc.)
Unrealistic financial opportunities
High income from work at home
High income from selling online
Promotions of high-return stocks.

At step 104, a database of key terms for each category or sub-category included in the hierarchical list of step 102 is composed. Each key term contains one or more key words that are commonly used in electronic text messages corresponding to a specific category or sub-category. For example, expressions "unlimited income working on your computer", "no online selling experience needed", or "we will train you how to make money on the Internet" may be defined as key terms associated with the sub-category "High income from selling online".

Even though particular key terms may also be found in legitimate electronic text messages, certain features, or criteria, thereof may be indicative of a spam message. Such criteria include, for example, a frequency of using and location of a key term (for example, in the title), optionally key term's appearance (for example, in bold or upper cases or in larger fonts), a number of words in the key term or the text message, and the like. In embodiments, at least some of the key terms are provided with weight factors, which correspond to pre-determined features that, selectively or collectively, may be defined for each category or sub-category.

Additionally, there may be defined key terms that uniquely identify a particular category or sub-category. Such key terms are referred to herein as characteristic key terms (for example, the key term "unlimited income" is a characteristic key term of the category "Unrealistic financial opportunities"). Illustratively, a weight factor of a characteristic key term is equal to 1 (or 100%), while other key terms have weight factors in a range from 0 to 1 (or 0 to 100%).

At step 106, a database of sample messages for each category or sub-category included in the hierarchical list of step 102 is composed. In contrast with the key terms, each sample message contains a sentence that identifies its link to a respective category or sub-category. For example, the key term "Free downloads of thousands of songs" corresponds to a sample message from the "Free music or movies" sub-category.

However, while some key terms uniquely identify a category or sub-category of the respective electronic text message, other key terms may also be found in legitimate electronic text messages. In particular, the same key term "Free downloads of thousands of songs" may be found in a message offering such downloads as a time-limited reward for buying an expensive service (e.g., subscription) or product. A key term may be associated with one or more similarity scores, which indicate a probability that the key term identifies an electronic text message corresponding to a specific category (or categories) or sub-category(ies) (for example, based on frequency of use, location, etc. of the key term in the text message, a number of words in the key term and the like).

Additionally, there may be key terms that uniquely identify a particular category or sub-category. Such key terms are referred to herein as characteristic key terms (for example, the key term "Buy stock XYZ now!" is a characteristic key term of the category "Unrealistic financial opportunities"). Illustratively, a similarity score of a characteristic key term is equal to 1 (or 100%), while other key terms have similarity scores in a range from 0 to 1 (or 0 to 100%).

At steps 104 and 106, the key terms are identified using language-specific variants or equivalents of particular words or combinations thereof. Optionally, such variants and equivalents may be produced by applying, for example, fuzzy text objects generation algorithms or using synonyms. For example, the expressions "make money on the Internet" and "free dose of the drug XYZ" may also be presented in the respective databases in modified forms such as "make money online" and "free doses of the drug XYZ", where the term "the Internet" is replaced with its synonym "online" and the word "doses" is replaced with its morphologically normalized variant "dose", in these examples.

In further embodiments, specific limitations may be associated with or, alternatively, not applied, for particular key terms of at least some categories or sub-categories. Such limitations may include, for example, requirements for a minimal number of repetitions of a particular text object (e.g., key term) or its presence in combination with other text objects (e.g., in combination with certain other key terms), and the like.

In operation, the list of message categories, databases of the key terms and sample messages, values of respective weight factors or similarity scores, can be periodically updated to address new subject matters and changes in semantics of the electronic text messages.

Together, steps 102, 104, and 106 constitute a routine 110 preparing a respective computing device 20 (discussed below in reference to FIG. 2) for classification of incoming new electronic text messages.

At step 122, a new electronic text message (for example, email or a portion thereof or an electronic version of a text document of any origin) is acquired by the computing device 20.

At step 124, a language (or languages) of the electronic text message is identified and, optionally, in step 125, certain pre-selected words or symbols in the message (for example, articles, prepositions, punctuation, and the like) are suppressed (i.e., ignored or filtered), or modified to take into account various spammer "tricks", such as replacing the letter "o" with a zero in some words, or replacing the letter lower case "L" with a "one" (numeral), or adding text to a message that has the same color as the background color (i.e., invisible to the human eye, but nonetheless perceived as text by the computer).

At step 126, using the database of sample messages (discussed in reference to step 106), the degree of similarity of the received message is calculated, relative to all the sample messages in the database. Also, it will be appreciated that rather than comparing the received message itself directly with every sample message in the database (which is a feasible, if a "brute force" approach), it is more computationally efficient to compare representations of the message to representations of the sample messages. Specifically, both the received message and the sample messages can be filtered, to remove unnecessary punctuation, dashes, noise words, words that generally carry little information (such as prepositions, articles, and so on). Also, words (or text strings) that are longer than some predefined threshold (for example, longer than 30 or 40 characters) can be a priori view as noise. Also, since spammers frequently insert such random sequences of letters into spam messages, in order to defeat bitwise, or signature, comparison, the presence of such long "noise" strings can be viewed as an additional red flag, in favor of spam. Morphological normalization can also be performed on the received message (as well as on the sample messages, to reduce the number of "distinct" sample messages that are minor variations of each other).

At step 128, using the database of key terms (discussed in reference to step 104), key terms, if any, are detected and identified in the received electronic text message.

Figure 2:
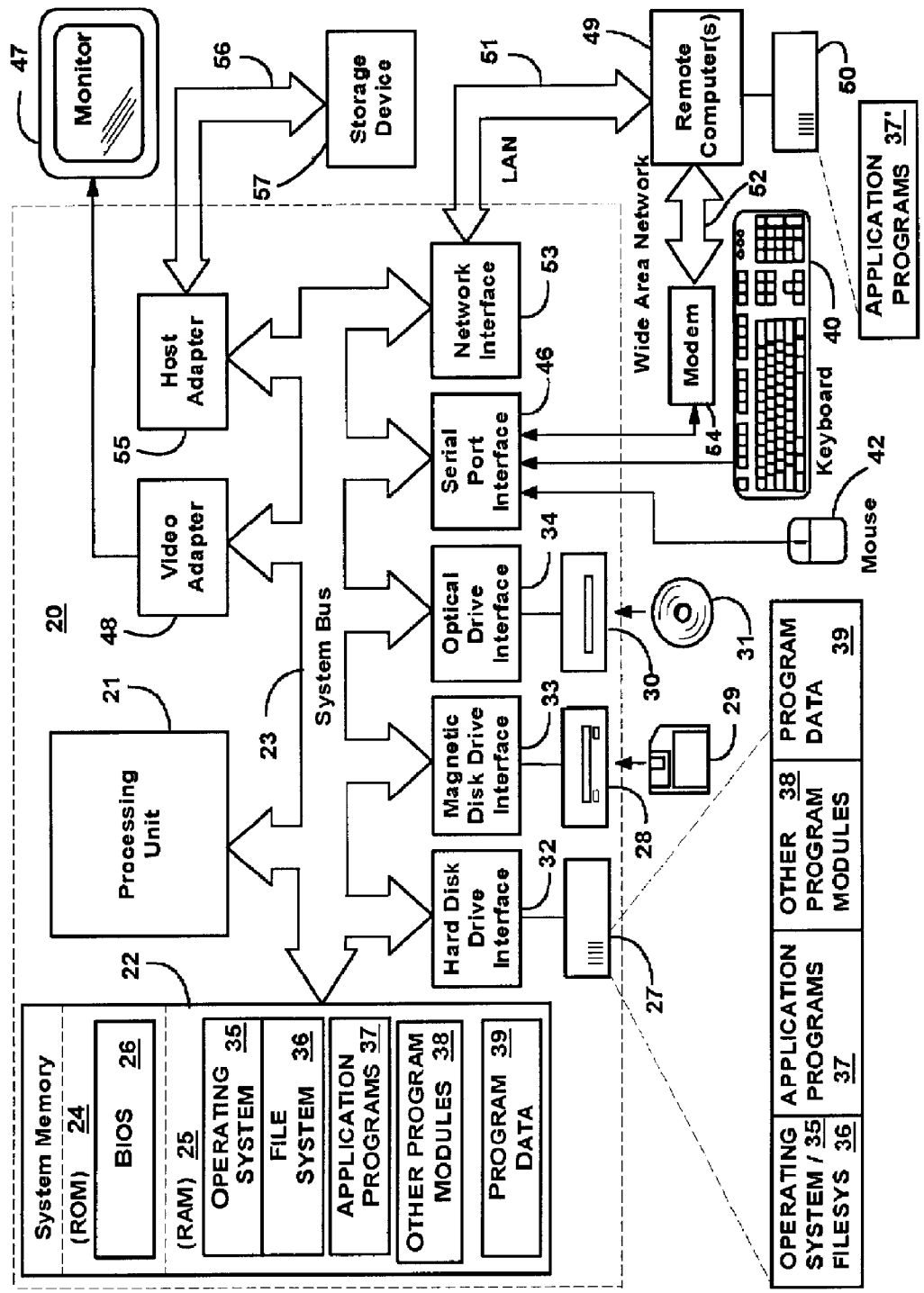
FIG. 2 illustrates an exemplary computer system that may be used to implement the method of FIG. 1.

Together, steps 122, 124, 125, 126, and 128 constitute a routine 120 preparing the electronic text message for analysis and/or filtering in the computing device 20 of FIG. 2.

At step 132, a weight factor of the electronic text message is calculated using, for example, the criteria applied, at step 104, to define weight factors of the key terms. In one embodiment, the weight factor of the electronic text message is defined as a sum or a normalized sum of the weight factors of the key terms that have been identified in the message at step 128. If at least one of the key terms detected in the electronic text message is a characteristic key term, the method 100 proceeds to step 150 (shown with a link 133), otherwise the method proceeds to step 134.

As will be appreciated, some of the key terms can have a higher weight assigned them than others, particularly as it relates to analysis for spam. For example, the term "Viagra" is by itself not a 100% guarantee that the message is spam—it is conceivable that illegitimate message could mention Viagra. Thus, the key term "Viagra" can be assigned a weight of, for example, 75%. On the other hand, the presence of a key term (in this case, key phrase) "buy Viagra now" can be assigned a very high weight, for example, 99%, or close to 100%, on the theory that a legitimate message is extremely unlikely to have that particular key term. Furthermore, the presence of certain tricks that spammers use to deceive spam filtering software is itself a potential red flag. For example, if the word "Viagra" was misspelled, for example, in the manner "V1agra", "Viaggra", "Viiagra", etc., then, while the key term itself may still be viewed as "Viagra," the weight assigned to this term can now be raised higher.

At step 134, the method 100 queries if the sum of the weight factors for all of the key terms in the electronic text message exceeds a first pre-determined threshold T1. If the query of step 134 is answered negatively, the method 100 proceeds to step 136 (shown with a link 137), where the similarity to any sample message in the relevant to the categories and sub-categories of step 102 is noted and the message is classified as one not associated with any of such categories or sub-categories. The message can then be passed on to the user (step 154), if it is not similar to any sample message to any category.

If the query of step 134 is answered affirmatively, the text message is considered to be associated with the respective category or sub-category, and the method 100 proceeds to step 150 (shown with a link 135). The system 100 then proceeds (151) to receive a new message.

At step 126, a similarity score of the electronic text message is calculated using, for example, the criteria applied at step 106, to define similarity between the received message relative to the sample messages. At step 144, the method 100 queries if the similarity score of the electronic text message exceeds a second pre-determined threshold T2 for any of the sample messages in the database, then the message is considered to belong to that category or subcategory. If the query of step 144 is answered negatively, the method 100 proceeds to step 146 (shown with a link 147), where the message is classified as one not sufficiently similar to any of the sample messages.

If the query of step 144 is answered affirmatively, the text message is considered to be associated with the respective category or sub-category, and the method 100 proceeds to step 150 (shown with a link 145). Otherwise, the message is passed on to the user (step 154).

At step 150, a list is composed of all categories or sub-categories associated, at either steps 132, 134, or 144, with the electronic text message. When no characteristic key terms were found in the electronic text message, a degree of relevance of the message is calculated for each one of such categories or sub-categories. In one embodiment, the degree of relevance of the electronic text message is calculated as a normalized arithmetic mean of the respective weight factor and similarity score of the received message, and the degree of relevance of the messages comprising characteristic key terms with a respective category or sub-category is equal to 1 (or 100%).

At step 152, using a pre-determined algorithm, the electronic text message is classified, or filtered, based on the results of calculating the degree of relevance of the message. For example, the electronic text message or a portion thereof, which degree of relevance with one or more spam-related categories or sub-categories exceeds a third pre-selected threshold T3, may be deleted or isolated. Alternatively, such a message may be selected for further analysis (for example, for tracing the message back to a source of its origin or based on other spam detection algorithms). In other embodiments, only messages which degree of relevance with one or more spam-related categories or sub-categories is less than a fourth pre-selected threshold T4 are made available or transmitted to the respective addressee(s).

As will be appreciated, an alternative to a "loop" that compares the received message to the sample messages one at a time (i.e., the steps 126, 144, 146, 150, etc. on the right half of FIG. 1), i.e., sequentially, can be relatively time consuming. An alternative is a "one pass" approach, where, using fuzzy logic, the system fairly quickly "zeroes in" on the sample messages (in one or more categories) that are the "closest" to the received message.

Together, steps 132, 134, 136, 144, 146, 150, 152 and 154 constitute a routine 130 of automated analysis and/or filtering of the electronic text message in the computing device 20 of FIG. 2.

Upon completion of step 152, the routines 120 and 130 are repeated (shown with a link 151) for remaining electronic text messages of interest.

In alternate embodiments, some method steps of the method 100 may be performed contemporaneously, in parallel, or in a different order. For example, portions of steps 104 and 106 or 134 and 144 may be performed contemporaneously or in parallel. Those skilled in the art will readily appreciate that the order of executing at least a portion of other discussed below method steps may also be modified.

Thus, it will be appreciated, that in FIG. 1, there are essentially two separate and generally independent processes going on—one is a process of identifying key terms in a message, and then determining whether the weight of the key terms is sufficient to classify the message (for example, as spam). This is shown on the left half of FIG. 1. The other process is a comparison of the received message to a database of sample, or template messages. It will be appreciated that, as a practical matter, that these two separate processes can be performed sequentially on the same physical computer, or using different threads in a multi-threaded environment, or using separate physical computers.

Furthermore, if one or the other process definitively identifies and categorizes a particular message, for example, as spam (regardless of which of the two reaches the verdict first, whether based on presence of key terms, or whether based on sufficient similarity to a sample message), the other process can then be suspended or terminated, now that the received message has been identified as spam with a sufficiently high probability.

Furthermore, it will be appreciated that the task of comparing the message to sample messages stored in a database is preferably be performed for each category and subcategory. It should be noted that the same message could conceivably relate to more than one category. For example, the same spam message could be identified as belonging both to a "get rich quick scheme" category and to a "penny stock scam category." Thus, the steps illustrated in elements 126, 144, 145, 146, 147, 150 and 152 are performed for each sample message in the database for each category, and for all the categories (or, optionally, for all the categories that the user has identified as being relevant to him).

Additionally, morphological transformation may need to be performed, to convert the words into their basic, or root form (for example, to avoid having to deal with the words America, American, Americanize as separate words, the root (America) can be used in the representation. Also, either techniques can be used to reduce the representation to the smaller "footprint" such as stripping out carriage returns, periods, and other punctuations.

Note also that the degree of morphological analysis (and consequently the amount of morphological complexities) are generally language-dependent. For example, the English language has some morphological complexities, but not as many as others. On the other hand, the Russian language has a much richer structure in terms of conjugation of verbs, roots, and so forth. Other languages can have their own complexities, for example, the German language has a particular "issue" with length of the words, since long compound words are much more common in German than in other European languages.

Additionally, normalization and morphological analysis may be performed to address attempts by spammers to use different alphabets. For example, the English letter "X" and the Cyrillic letter "X" look the same, although they have a different sound, but, more importantly, the same word (e.g., "SEX" written using only English letters, or using "SE" in English encoding and "X" using a Cyrillic encoding) would appear to be different words. Similarly, the English letter "P" and the Cyrillic letter "P" (which has an "r" sound) look identical, but require different encoding. The main language of the message can be identified, and the letters from different alphabets normalized, to a single language.

Additionally, it will be appreciated that fuzzy logic can also be used to more quickly identify whether any of the words or phrases in the received message match up with any of the key terms in the database.

With reference to FIG. 2, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24. The personal computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used. Such computers as described above can be used in conventional networks, e.g., the Internet, local area networks, regional networks, wide area networks, and so forth. These networks can link various resources, such as user computers, servers, Internet service providers, telephones connected to the network, and so on.

Aspects of the present invention have illustratively been described above within the context of text messages acquired electronically or portions of such messages. The invention may also be utilized within context of other text-containing documents, which have been converted in an electronic format, including but not limited to advertisements, articles, books, and the like. It has been contemplated and is within the scope of the invention that the method 100 is utilized within the context of such documents.

The method 100 may be implemented in hardware, software, firmware, or any combination thereof in a form of a computer program product comprising computer-executable instructions. When implemented in software, the computer program product may be stored on or transmitted using a computer-readable medium adapted for storing the computer-executable instructions or transferring the computer program product from one computer to another.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method of identifying electronic text messages as spam, the method comprising:
   (a) creating a hierarchic list of spam message categories and sub-categories, wherein the hierarchic list defines properties of key terms within the spam message categories and sub-categories;
   (b) composing a database of the key terms and a database of sample messages in a human language for each of the spam message categories and message templates for sub-categories, wherein the key terms are identified using human language-specific variants of a combination of separate words in a particular human language;
   (c) defining at least one spam message category from the hierarchic list of the spam message categories for which (i) a weight factor of a morphologically transformed text message exceeds a first pre-determined threshold or (ii) a similarity score of the text message exceeds a second pre-determined threshold, wherein the weight factor value and the similarity score value are compared against the respective threshold values using a precise matching comparison; and
   (d) associating with the at least one spam message category the text message having (i) the weight factor value exceeding the first threshold or (ii) the similarity score value exceeding the second threshold, wherein the properties of the key terms within the spam message categories are any of:
   a frequency of occurrence of the key term within the message;
   a location of the key term within the message; and
   a number of separate words in the key term.

2. The method of claim 1, wherein the text messages are electronically acquired text documents or portions thereof.

3. The method of claim 1, wherein the text messages are electronic mail (email) messages or portions thereof.

4. The method of claim 1, wherein each of the key terms comprises at least one separate word in a particular human language.

5. The method of claim 1, wherein step (b) further comprises producing variants of the key terms or sample spam messages using at least one fuzzy text objects generation algorithm.

6. The method of claim 1, wherein step (c) comprises:
identifying human language(s) of the text message; and
ignoring, in the text message, pre-selected separate words in the identified human language.

7. The method of claim 6, further comprising at least one of:
calculating the weight factor of the text message as a sum or a normalized sum of weight factors of the key terms identified in the text message based on the identified human language; and
calculating the similarity score of the text message as a sum or a normalized sum of similarity scores relative to a plurality of previously identified sample messages in the identified human language.

8. The method of claim 6, further comprising:
determining the weight factors of the key terms based on their frequency of use or location in the text message, or a number of words in a key term; and
identifying characteristic key terms that correspond to a particular message category from the hierarchic list of spam message categories.

9. The method of claim 1, wherein step (d) further comprises isolating or deleting the text message or portion thereof associated with a pre-selected category from the hierarchic list of spam message categories.

10. The method of claim 1, wherein morphological transforming of the text message reduces the words to their dictionary variations and removes noise words.

11. The method of claim 1, further comprising identifying a primary language of the text message, and normalizing the letters in the text message to their English encoding.

12. A non-transitory computer useable recording medium storing computer executable program logic that, when executed by a processor, causes a computer system to perform the steps of the method of claim 1.

13. A system for classifying electronic text messages, the system comprising:
a processor; and
a non-transitory memory device storing instructions of an operating system and an application program that, when executed by the processor, is adapted to provide:
(a) a hierarchic list of spam message categories and subcategories, wherein the hierarchic list defines properties of key terms within the spam message categories;
(b) a database of the key terms and a database of sample messages in a human language for each of the spam message categories and message templates for sub-categories, wherein the key terms are identified using human language-specific variants of a combination of separate words in a particular human language;
(c) wherein the system defines at least one spam message category from the hierarchic list of the spam message categories for which (i) a weight factor of a morphologically transformed text message exceeds a first pre-determined threshold or (ii) a similarity score of the text message exceeds a second pre-determined threshold, wherein the weight factor value and the similarity score value are compared against the respective threshold values using precise matching comparison; and
(d) the at least one spam message category is associated with the text message having (i) the weight factor value exceeding the first threshold or (ii) the similarity score value exceeding the second threshold, wherein the properties of the key terms within the spam message categories are any of:
a frequency of occurrence of the key term within the message;
a location of the key term within the message; and
a number of separate words in the key term.

14. The system of claim 13, wherein the text messages are electronically acquired text documents, electronic mail (email) messages, or portions thereof.

15. The system of claim 13, wherein at least one of the databases comprise variants of the key terms or sample phrases, the variants produced using at least one fuzzy text objects generation algorithm.

16. The system of claim 13, wherein:
the weight factor of the text message is a sum or a normalized sum of weight factors of the key terms identified in the text message; and
the similarity score of the text message is a sum or a normalized sum of similarity scores relative to a plurality of previously identified sample messages.

17. The system of claim 16, wherein:
the weight factors of the key terms or the similarity scores of the sample phrases are determined based on their frequency of use, location, or appearance in the text message, or a number of words in a key term, a sample phrase, or the text message; and
specific key terms or sample phrases uniquely identify a particular message category from the hierarchic list of message categories.

18. The non-transitory computer useable recording medium of claim 12, wherein the recording medium contains software code for defining the at least one message category and executes the steps of:
identifying a human language(s) of the text message;
ignoring in the text message pre-selected words, symbols, or combinations thereof;
calculating the weight factor of the text message as a sum or a normalized sum of weight factors of the key terms identified in the text message;
calculating the similarity score of the text message as a sum or a normalized sum of similarity scores of the sample messages identified as similar to the text message; and
isolating or deleting the text message or portion thereof associated with a pre-selected category from the hierarchic list of message categories.

19. The non-transitory computer useable recording medium of claim 18, wherein the weight factors of the key terms are determined based on their frequency of use, location, or appearance in the text message, or a number of words in a key term, a sample phrase, or the text message.

20. The method of claim 1, wherein step (c) comprises:
identifying human language(s) of the text message; and
ignoring, in the text message pre-selected symbols, or combinations of symbols.

* * * * *